(12) United States Patent
Rao et al.

(10) Patent No.: US 12,416,811 B1
(45) Date of Patent: Sep. 16, 2025

(54) OPTICAL SYSTEM AND DISPLAY DEVICE

(71) Applicant: GOERTEK OPTICAL TECHNOLOGY CO., LTD., Shandong (CN)

(72) Inventors: Yi Rao, Weifang (CN); Chaiyuan Shi, Weifang (CN); Xiaoyue Liu, Weifang (CN)

(73) Assignee: GOERTEK OPTICAL TECHNOLOGY CO., LTD., Weifang (CN)

( * ) Notice: Subject to any disclaimer, the term of this patent is extended or adjusted under 35 U.S.C. 154(b) by 0 days.

(21) Appl. No.: 19/065,913

(22) Filed: Feb. 27, 2025

(30) Foreign Application Priority Data

Jun. 14, 2024 (CN) .......................... 202410764070.8

(51) Int. Cl.
*G02B 1/10* (2015.01)
*G02B 9/34* (2006.01)
*G02B 27/01* (2006.01)
*G02B 27/09* (2006.01)
*G02B 27/28* (2006.01)

(52) U.S. Cl.
CPC ..... *G02B 27/0172* (2013.01); *G02B 27/0955* (2013.01); *G02B 27/283* (2013.01); *G02B 27/286* (2013.01)

(58) Field of Classification Search
CPC ............ G02B 27/0172; G02B 27/0955; G02B 27/283; G02B 27/286
USPC ........................................................ 359/630
See application file for complete search history.

(56) References Cited

U.S. PATENT DOCUMENTS

2020/0026075 A1   1/2020   Kim et al.

FOREIGN PATENT DOCUMENTS

| CN | 115097629 A | 9/2022 |
| CN | 118068563 A | 5/2024 |
| TW | M623420 U | 2/2022 |
| WO | 2023221239 A1 | 11/2023 |
| WO | 2024021510 A1 | 2/2024 |

OTHER PUBLICATIONS

First Office Action issued in Chinese Application No. 202410764070.8; mailed Jul. 18, 2024; 10 pgs.
Notice of Grant issued in Chinese Application No. 202410764070.8; mailed Aug. 6, 2024; 5 pgs.

*Primary Examiner* — Bumsuk Won
*Assistant Examiner* — Grant A Gagnon
(74) *Attorney, Agent, or Firm* — HAUPTMAN HAM, LLP

(57) ABSTRACT

An optical system, including: a beam splitter, a phase retarder, a polarization reflection element, a lens group, and a second lens. The beam splitter, the phase retarder and the polarization reflection element are provided along a same optical axis, and the phase retarder is provided between the beam splitter and the polarization reflection element; the lens group and the second lens are provided along the optical axis, the lens group at least includes a first lens, and the first lens is provided on a side of the beam splitter away from the phase retarder, and the first lens satisfies: $0.7 \leq |H_1 - H_0/H_2 - H_0| \leq 3$.

12 Claims, 18 Drawing Sheets

OPTICAL SYSTEM AND DISPLAY DEVICE

CROSS-REFERENCE TO RELATED APPLICATIONS

This application claims priority to Chinese Patent Application No. 202410764070.8, filed on Jun. 14, 2024, the entire contents of which are incorporated herein by reference.

TECHNICAL FIELD

The present application relates to the technical field of optical, and in particular to an optical system and a display device.

BACKGROUND

With the rapid development of virtual reality (VR) technology, the demand for high-definition VR display devices in the commercial office field is increasing. In VR optical systems, the "ghosting" phenomenon is a common problem that significantly reduces the contrast and clarity of the image, especially at full field of view angle. Therefore, how to reduce "ghosting" and improve the image quality of the full field of view has become an important direction for the research and development of VR optical systems.

SUMMARY

The main purpose of the present application is to provide a new technical solution for an optical system and a display device.

According to a first aspect, the present application provides an optical system, including: a beam splitter, a phase retarder, a polarization reflection element, a lens group and a second lens;

the beam splitter, the phase retarder and the polarization reflection element are provided along a same optical axis, and the phase retarder is provided between the beam splitter and the polarization reflection element;

the lens group and the second lens are provided along the optical axis, the lens group at least includes a first lens, and the first lens is provided on a side of the beam splitter away from the phase retarder;

the first lens satisfies: $0.7 \leq |H_1-H_0|/|H_2-H_0| \leq 3$, $H_1$ is a maximum thickness of the first lens at a specific aperture, $H_2$ is a thickness of the first lens at an optical aperture of 1.0, and $H_0$ is a center thickness of the first lens.

In an embodiment, the maximum thickness of the first lens at a specific aperture is a maximum thickness of the first lens at an optical aperture of 0.35 to 0.67.

In an embodiment, the second lens is provided between the beam splitter and the phase retarder.

In an embodiment, the optical system further includes a display screen, and the display screen is provided on a side of the lens group away from the second lens.

In an embodiment, a superimposed element is provided on a side of the first lens away from the display screen, and the superimposed element includes a first retardation plate, a second retardation plate, and a polarizing film provided between the first retardation plate and the second retardation plate.

In an embodiment, the beam splitter is provided on a surface of the second lens close to the display screen, and the phase retarder and the polarization reflection element are sequentially stacked on a surface of the second lens away from the display screen.

In an embodiment, the optical system further includes a polarization element, the polarization element is stacked on a surface of the polarization reflection element away from the phase retarder, and the polarization element, the polarization reflection element and the phase retarder form a composite film.

In an embodiment, the lens group further includes a third lens, and the third lens is provided between the first lens and the display screen, a minimum radius of curvature of a surface of a non-filmed lens in the lens group is $R_{min}$, a focal power of the optical system is $\varphi$, and $R_{min}$ and $\varphi$ satisfy: $R_{min} \cdot \varphi \geq 0.4$.

In an embodiment, a focal power of the lens group is $\varphi_1$, and $\varphi_1$ and $\varphi$ satisfy: $0.5 \leq \varphi_1/\varphi < 1$.

In an embodiment, a thickness of the first lens at 0.7 optical aperture is $H_3$, a thickness of the third lens at 0.7 optical aperture is $H_4$, and $H_3$ and $H_4$ satisfy: $|H_3-H_4| \leq 1$ mm.

In an embodiment, a maximum thickness of the third lens from 0.35 optical aperture to 0.67 optical aperture is $H_5$, and when $H_5 > H_1$, the third lens satisfies: $0.7 \leq |H_5-H_0'|/|H_0-H_0'| \leq 3$, $H_6$ is a thickness of the third lens at 1.0 optical aperture, and $H_0'$ is a center thickness of the third lens.

In an embodiment, a protective glass is provided on a side of the display screen close to the first lens, and the protective glass includes at least one layer and a total thickness of the protective glass is greater than or equal to 5 mm.

According to a second aspect, the present application provides a display device, the display device includes a housing and the optical system as described in the above embodiments.

The beneficial effects of the present application are as follows:

The present application provides an optical system that improves the image quality of the optical system in the full field of view by optimizing the lens design and combining components such as a beam splitter, a phase retarder, and a polarization reflection element, especially significantly improving the imaging quality of the edge field of view. This unique design of the lens thickness not only fine-tunes the propagation path of light, but also effectively reduces the optical path difference caused by light refraction. Through the method, the lens can provide a wider and clearer visual experience, especially in the edge field of view area, the imaging quality has been significantly improved, meeting the demand for high-definition display devices in the commercial office field.

Other features and advantages of the present specification will become apparent from the following detailed description of exemplary embodiments of the present specification with reference to the accompanying drawings.

BRIEF DESCRIPTION OF THE DRAWINGS

The accompanying drawings, which are incorporated in and constitute a part of the specification, illustrate embodiments of the specification and, together with the description, serve to explain the principles of the specification.

DETAILED DESCRIPTION OF THE EMBODIMENTS

Various exemplary embodiments of the present application will now be described in detail with reference to the accompanying drawings. It should be noted that unless otherwise specifically stated, the relative arrangement of components and steps, numerical expressions and numerical values described in these embodiments do not limit the scope of the present application.

The following description of at least one exemplary embodiment is actually only illustrative and is in no way intended to limit the present application and its application or use.

The techniques and devices known to those skilled in the art may not be discussed in detail, but where appropriate, the techniques and devices should be considered as part of the specification.

In all examples shown and discussed herein, any specific value should be interpreted as merely exemplary and not as a limitation. Therefore, other examples of the exemplary embodiments may have different values.

It should be noted that similar numbers and letters represent similar items in the following figures, so once an item is defined in one figure, it does not need to be further discussed in subsequent figures.

The optical system and display device provided in the embodiment of the present application are described in detail below in conjunction with the accompanying drawings.

According to one aspect of the embodiment of the present application, an optical system is provided, which can be applied to a display device, such as a VR optical display device. The optical system can also be applied to other types of display devices.

Figure 1:
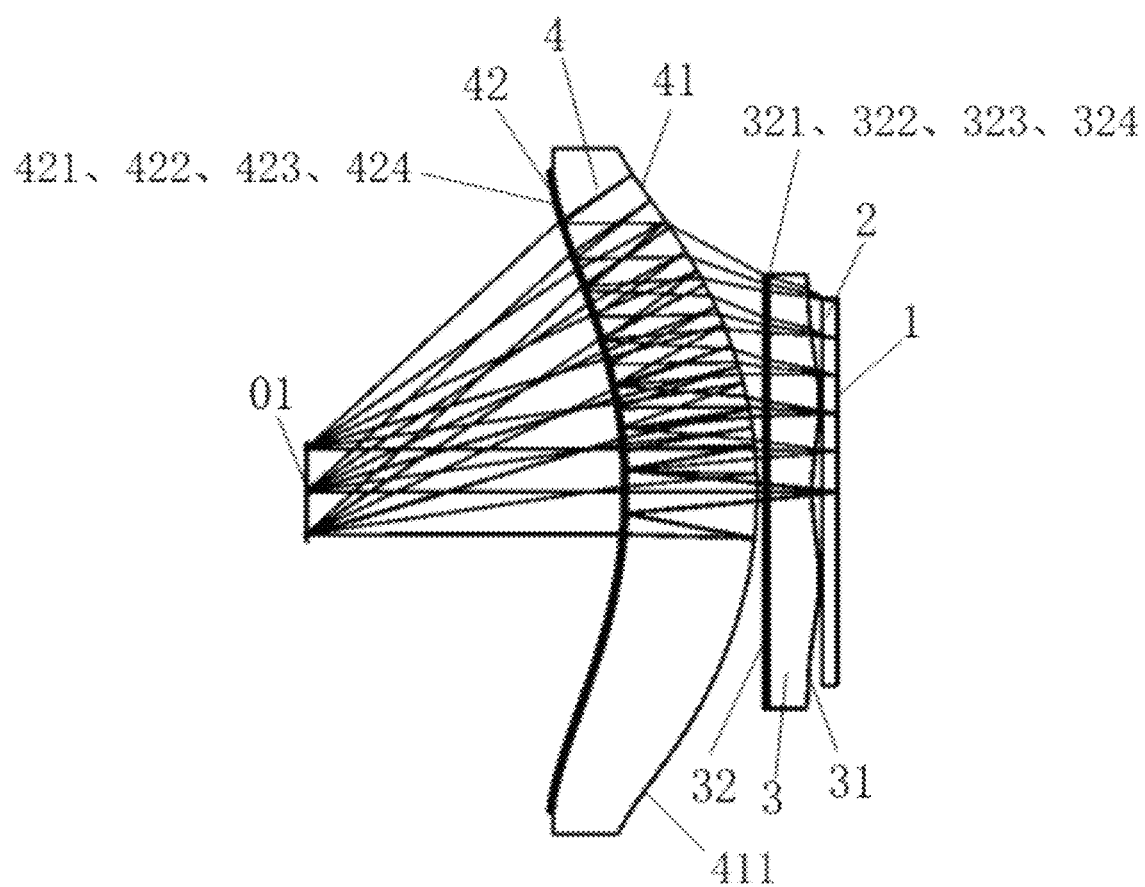
FIG. 1 is a structural schematic diagram of an optical system according to a first embodiment of the present application.
Figure 2:
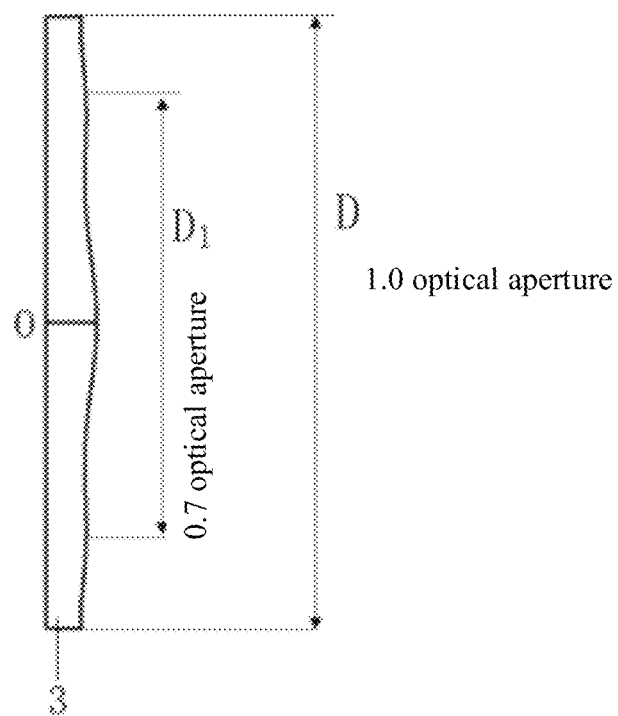
FIG. 2 is a side view of lens near a display screen of the optical system according to an embodiment of the present application.

The present application provides an optical system. As shown in FIG. 1 and FIG. 2, the optical system includes a beam splitter 411, a phase retarder 424 and a polarization reflection element 423 provided along the same optical axis, and the phase retarder 424 is provided between the beam splitter 411 and the polarization reflection element 423. The optical system also includes a lens group and a second lens 4 provided along the optical axis, the lens group at least includes a first lens 3, the first lens 3 is provided on the side of the beam splitter 411 away from the phase retarder 424. The first lens 3 satisfies: $0.7 \leq |H_1-H_0|/|H_2-H_0| \leq 3$, $H_1$ is the maximum thickness of the first lens 3 at a specific aperture, $H_2$ is the thickness of the first lens 3 at an optical aperture of 1.0, and $H_0$ is the center thickness of the first lens 3.

The optical system provided in the embodiment of the present application introduces the beam splitter 411, the phase retarder 424 and the polarization reflection element 423 in the optical path, and these optical elements can be used to form a folded optical path in combination with the lens group. The introduction of the folded optical path in the optical system can reduce the size of the optical system along the optical axis while ensuring the optical effect, thereby reducing the volume and weight of the optical system.

Figure 9:
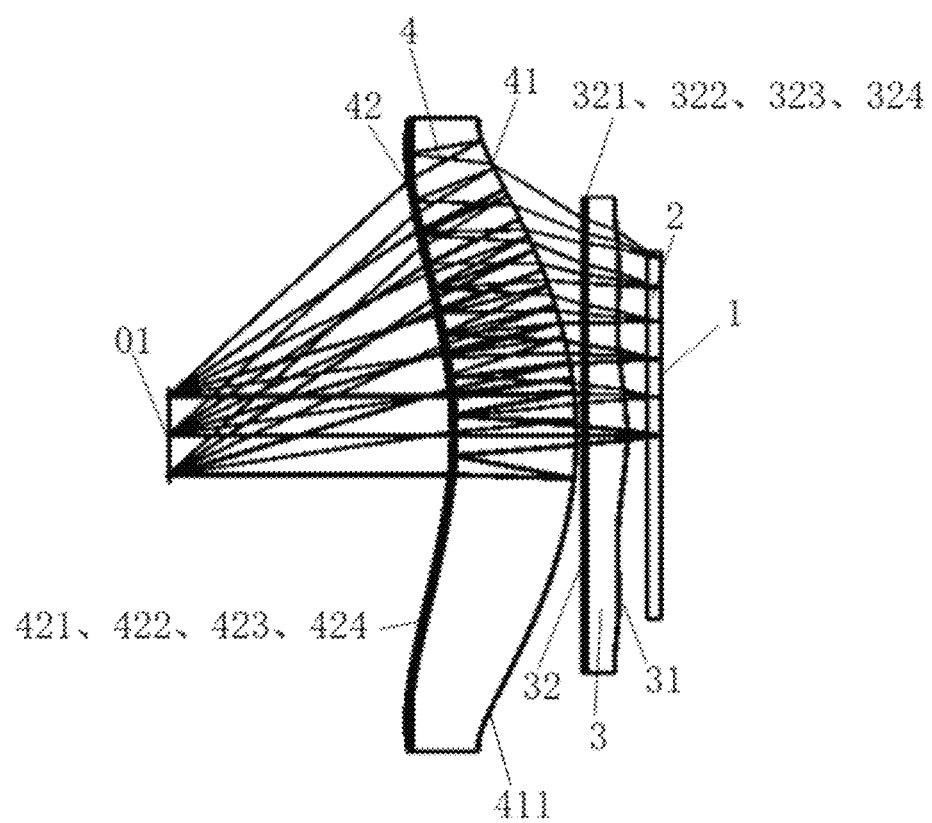
FIG. 9 is a structural schematic diagram of the optical system according to a second embodiment of the present application.
Figure 14:
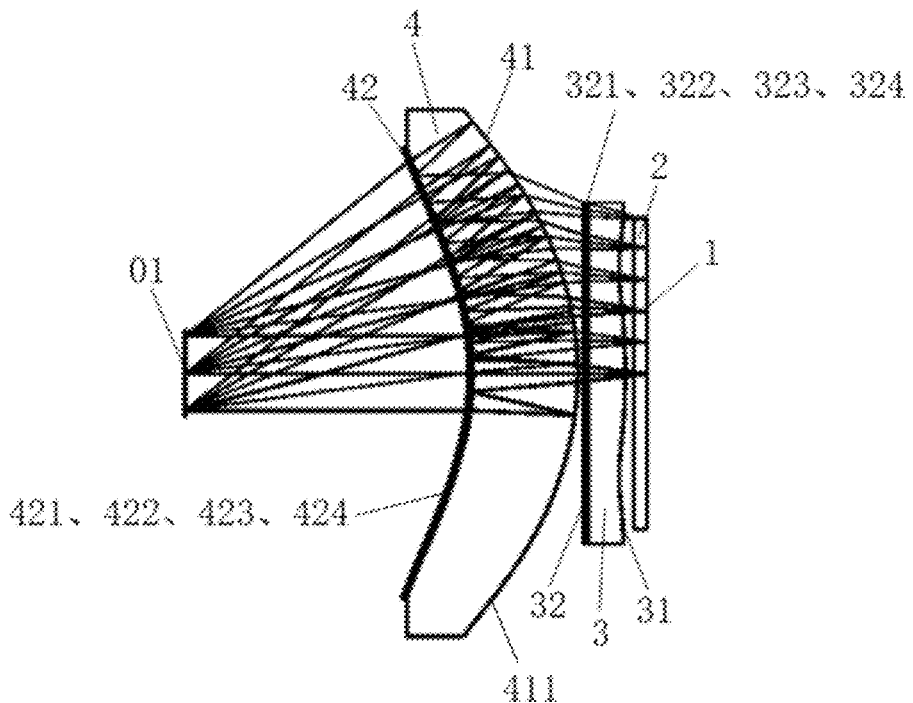
FIG. 14 is a structural schematic diagram of the optical system according to a third embodiment of the present application.
Figure 19:
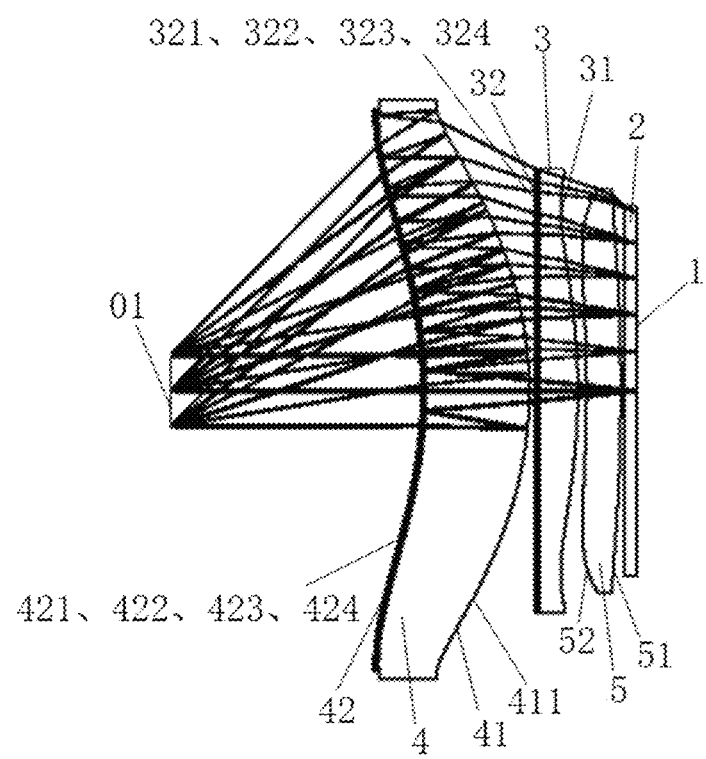
FIG. 19 is a structural schematic diagram of the optical system according to a forth embodiment of the present application.

For example, as shown in FIG. 1, FIG. 9 and FIG. 14, the optical system of the embodiment of the present application only needs two lenses (such as the first lens 3 and the second lens 4) at least to achieve complex optical imaging functions. As shown in FIG. 19, the optical system provided by the embodiment of the present application can also appropriately increase the lens, such as adding the third lens 5. The increase in the number of lenses is beneficial to improving the image quality.

In the present application, by optimizing the thickness ratio of different regions of a lens in the lens group near a side of a display screen, the optical system can ensure clear imaging within the full field of view, especially improving the image quality of the edge field of view. This design improves the optical display performance of the optical system and makes an outstanding contribution to improving the imaging quality and user visual experience.

The optical system provided by the embodiment of the present application uses a lens group on a side near the display screen, and one lens in the lens group, such as the first lens 3, is designed to meet a specific thickness ratio relationship: $0.7 \leq |H_1-H_0|/|H_2-H_0| \leq 3$, $H_1$ is the maximum thickness of the first lens 3 at a specific aperture, $H_2$ is the thickness of the first lens 3 at an optical aperture of 1.0, and $H_0$ is the center thickness of the first lens 3. Through the thickness relationship design of a lens near the display screen, good control of the thickness distribution of the lens near the display screen is achieved, which helps to reduce the light refraction difference caused by the change in lens thickness, and can improve the image quality in the full field of view and the image quality of the edge field of view.

As shown in FIG. 2, FIG. 2 shows a lens near the display screen, which is, for example, the first lens 3 shown in FIG. 1, FIG. 9 and FIG. 14. Specifically, the thickness at the center O of the first lens 3 shown in FIG. 2 is $H_0$. $D_1$ shown in FIG. 2 is the aperture range from the center O to 0.7 optical aperture of the first lens 3, and the maximum thickness in a part of the aperture range is $H_1$. D shown in FIG. 2 is the 1.0 optical aperture of the first lens 3, and the thickness of the first lens 3 at the 1.0 optical aperture is the above-mentioned $H_2$.

As shown in FIG. 1, FIG. 9 and FIG. 14, the thickness ratio relationship provided in the embodiment of the present application is explained by taking the first lens 3 near the display screen as an example. It should be noted that as the number of lenses in the lens group near the display screen increases, it is not limited to the first lens 3 that satisfies the above-mentioned thickness ratio relationship, and other lenses can also satisfy the above-mentioned thickness ratio relationship. As long as there is a lens in the optical system that satisfies the above-mentioned thickness ratio relationship, it is best to be the lens close to the display screen, which can improve the imaging quality and improve the imaging of the edge field of view.

As shown in FIG. 1, FIG. 9 and FIG. 14, the center thickness $H_0$ of the first lens 3 is a basic parameter in the design of the lens near the display screen in the optical system, and is related to parameters such as the focal power and aperture size of the lens. In the above-mentioned specific ratio relationship satisfied by the lens thickness, the center thickness $H_0$ of the first lens 3 is used as a reference value to calculate the relative difference between the thickness of other positions of the first lens 3 and the center thickness $H_0$ of the first lens 3.

The thickness $H_2$ of the first lens 3 at 1.0 optical aperture is another important parameter in the design of the lens. In the above-mentioned specific proportional relationship satisfied by the lens thickness, the difference between $H_2$ and $H_0$ is used to evaluate the distribution and variation of the lens thickness.

By rationally controlling the distribution of lens thickness, fine management of optical path difference can be achieved, which is an important aspect in the design of optical systems. Optical path difference refers to the optical path difference (i.e., the distance traveled by light waves) caused by the difference in medium refractive index when light passes through different media, or caused by the difference in path length when light passes through different paths.

As shown in FIG. 1, FIG. 9 and FIG. 14, as a lens near the display screen, the thickness ratio of the first lens 3 has a greater impact on the optical performance of the optical system.

Specifically, the first lens 3 is the first lens near the display screen, and the first lens 3 is the first lens to contact the incident light. Therefore, the initial refraction and focusing effect of the first lens 3 on the light has a decisive influence on the optical performance of the entire optical system. If the thickness ratio of the first lens 3 is not appropriate, it will cause a large refraction error in the initial stage of the light, and these errors will accumulate in the subsequent lenses, eventually leading to a serious decline in the imaging quality.

In general, when the first lens 3 is used as the first lens near the display screen, its thickness ratio has a greater impact on the optical performance, because the first lens plays a core role in the optical system, and its thickness ratio directly determines the refraction and focusing effect of the light in the lens. A suitable thickness ratio can ensure that the light propagates evenly inside the lens, reduce aberrations and distortions, thereby improving the imaging quality of the entire optical system.

The lens is an indispensable element in the optical system, and its design directly affects the propagation path and optical path difference of the light. In the present application, by adjusting the thickness of different positions on a lens near the display screen, the refraction path of the light in the lens can be changed, thereby controlling the optical path difference. The details are as follows:

improvement of imaging quality in the full field of view: by optimizing and controlling the thickness of a specific position of the lens, it is helpful to improve the imaging quality in the full field of view. By reducing the optical path difference, it can be ensured that the light can be more accurately focused on the imaging surface after passing through the lens, thereby improving the clarity and contrast of the image.

improvement of imaging quality in the edge field of view: the imaging quality of the edge field of view is easily affected by the optical path difference. Since the path of light passing through the lens in the edge field of view is significantly different from the path of light in the central field of view, optical path difference is easily generated. In the present application, by precisely controlling the thickness distribution of the lens, the optical path difference generated by the light in the edge field of view in the lens can be effectively reduced, thereby significantly improving the imaging quality of the edge field of view.

Managing the optical path difference by controlling the thickness distribution of the lens is an effective method to improve the imaging quality of the full field of view and the edge field of view. The method can obtain clearer and more accurate images.

In the optical system provided in the embodiment of the present application, the beam splitter 411 can be a semi-transparent and semi-reflective film, which allows a portion of the light to be transmitted and another portion of the light to be reflected.

It should be noted that the reflectivity and transmittance of the beam splitter 411 can be flexibly adjusted according to specific needs, and this is not limited in the embodiment of the present application.

In the optical system provided in the embodiment of the present application, the phase retarder 424 can be used to change the polarization state of light. For example, the phase retarder 424 can be used to convert linear polarized light into circular polarized light, or to convert circular polarized light into linear polarized light. The phase retarder 424 here can be a quarter wave plate (i.e., a phase retarder film).

The phase retarder 424 can be set as other phase retarder films as needed.

In the optical system provided in the embodiment of the present application, the polarization reflection element 423 is a polarization reflector that reflects horizontally polarized light and transmits vertically polarized light, or a polarized reflector that reflects linearly polarized light at any other specific angle and transmits linearly polarized light in a direction perpendicular to the angle.

In the embodiment of the present application, the phase retarder 424 and the polarization reflection element 423 can be combined together to form a composite film, which can be used with the beam splitter 411 to analyze and transmit light.

The solution provided in the embodiment of the present application enables the optical system to provide high-quality optical performance through carefully configured optical elements and lens groups. The coordinated work of the beam splitter 411, the phase retarder 424 and the polarization reflective element 423 can precisely control the propagation and polarization state of light, thereby obtaining a clear and accurate image.

In some examples of the present application, the maximum thickness of the first lens 3 at a specific aperture is the maximum thickness of the first lens 3 at an optical aperture of 0.35 to 0.67.

In an embodiment, the maximum thickness of the first lens 3 at an optical aperture of 0.35 to 0.67 refers to the maximum value of the lens thickness within a radius range of approximately 35% to 67% extending outward from the center of the lens. The selection of this area is based on the needs of optical system design, mainly considering that when light passes through the lens, the light in these areas has a greater impact on the overall imaging quality and the imaging quality of the edge field of view.

As is shown in FIG. 2, FIG. 2 shows a range of the center O to 0.7 optical aperture of the first lens 3, and a range of the center O to 1.0 optical aperture of the first lens 3. In an embodiment, 0.35 optical aperture to 0.67 optical aperture is within the range of the center O to 0.7 optical aperture.

In some examples of the present application, as shown in FIG. 1, FIG. 9 and FIG. 14, the second lens 4 is provided between the beam splitter 411 and the phase retarder 424.

The optical system provided in the embodiment of the present application includes at least a first lens 3 and a second lens 4 provided along the optical axis.

In an embodiment, the first lens 3 is designed to be located on the side of the beam splitter 411 away from the second lens 4, which means that the externally projected light first passes through the first lens 3 and then passes through other optical elements (such as the beam splitter 411 and the phase retarder 424). That is, the first lens 3 is the first lens near the display screen at this time.

In an embodiment, the second lens 4 is provided between the beam splitter 411 and the phase retarder 424. In an embodiment, the beam splitter 411 can be a semi-transparent and semi-reflective film, and the phase retarder 424 can be a ¼ wave plate. A polarization reflection element 423 is provided on the other side of the phase retarder 424. In this way, the second lens 4 is in the folded optical path, and the second lens 4 is used to further focus or correct the light.

The combination of the first lens 3 and the second lens 4 helps to improve the optical performance of the optical system and reduce aberrations and distortions.

It should be noted that the optical system provided in the embodiment of the present application includes but is not limited to using only two lenses, and the number of lenses can be appropriately increased as needed, as shown in FIG. 19.

Since the optical system can include multiple lenses (two or more), the performance of the optical system can be optimized by adjusting the type, material and position of the lens to meet specific application requirements.

In some examples of the present application, as shown in FIG. 1, FIG. 9 and FIG. 14, the optical system also includes a display screen 1, which is located on the side of the lens group away from the second lens 4.

In an embodiment, the display screen 1 is used to emit light for imaging display.

In some examples of the present application, a protective glass 2 is stacked on the light-emitting surface of the display screen 1, and the total thickness of the protective glass 2 is greater than or equal to 0.5 mm.

A protective glass is stacked on the light-emitting surface of the display screen 1, and the total thickness of the protective glass 2 is designed to be greater than or equal to 0.5 mm. This design not only enhances the physical protection capability of the display screen 1, but also brings additional technical effects to the optical system. The specific technical effects are as follows.

First, by stacking a protective glass on the light-emitting surface of the display screen 1, the impact resistance and scratch resistance of the display screen 1 can be significantly improved. In use, the display screen 1 may face various external physical impact and scratch risks, such as accidental touches by objects such as fingers and pen tips. These potential physical damages will not only affect the appearance of the display screen 1, but may also cause irreversible damage to its display effect. The existence of the protective glass is like a barrier, which effectively isolates these potential risks, thereby greatly extending the service life of the display screen.

Secondly, the thickness of the protective glass is restricted to be greater than or equal to 0.5 mm. On the one hand, a sufficiently thick protective glass can provide better physical protection, making the display screen 1 safer when facing external impacts. On the other hand, through reasonable thickness control, the tolerance of the optical solution to dirt on the screen surface can be effectively improved. That is, from an optical point of view, even if the screen surface is dirty, it is not easy to have a significant adverse effect on the display effect of the screen. In actual use, dust, fingerprints and other dirt are easily accumulated on the surface of the display screen 1. These dirt will not only affect the display effect, but may also have a negative impact on the performance of the optical system. Protective glass of sufficient thickness can form a relatively closed environment, effectively isolating the entry of external dirt, thereby ensuring the stability and reliability of the optical system.

In some examples of the present application, as shown in FIG. 1, a superimposed element is provided on the side of the first lens 3 away from the display screen 1; the superimposed element includes a first retardation plate 324, a second retardation plate 322, and a polarizing film 323 provided between the first retardation plate 324 and the second retardation plate 322.

The first retardation plate 324 and the second retardation plate 322 are ¼ wave plates.

The superimposed element mentioned in the example of the present application includes a first retardation plate 324, a second retardation plate 322, and a polarizing film 323 provided between the first retardation plate 324 and the second retardation plate 322, and the combination of these elements is designed to reduce the "ghost" phenomenon of the optical system.

It should be noted that the "ghost" phenomenon is an interference image formed by multiple reflections and refractions of light in the optical system. Between the display screen 1 and the beam splitter 411, due to the multiple effects of light, the "ghost" phenomenon may be particularly obvious, which will seriously affect the imaging quality and the user's visual experience.

The above-mentioned superimposed element is introduced in the present application, and the superimposed element includes two retardation plates: a first retardation plate 324 (such as a quarter wave plate) and a second retardation plate 322 (such as a quarter wave plate). The retardation plate here is an element that can change the polarization state of light. The quarter wave plate can change linear polarized light into circular polarized light or elliptically polarized light, or change circular polarized light or elliptically polarized light into linear polarized light. In this design, the role of the two quarter wave plates may be to regulate the phase delay of the light twice, so that the light has a specific polarization state after passing through the two wave plates, reducing unnecessary interference in reflection and refraction, thereby reducing the "ghost" phenomenon.

Polarizing film 323, which is an element that can selectively transmit or reflect light in a specific polarization direction. In this design, the polarizing film 323 is located between the two retardation plates, which can further regulate the polarization state of the light, ensuring that only light in a specific polarization direction can pass, thereby reducing unnecessary reflection and refraction, and reducing the "ghost" phenomenon.

In the present application, through the synergistic effect of the first retardation plate 324, the second retardation plate 322 and the polarizing film 323, the multiple reflections and refractions of light between the display screen 1 and the beam splitter 411 can be effectively reduced, thereby reducing the "ghost" phenomenon, which is conducive to improving the imaging quality and thus enhancing the user's visual experience.

In addition, the design of the superimposed element not only reduces the ghost phenomenon, but also may regulate other properties of light (such as brightness, contrast, etc.), thereby further improving the overall performance of the optical system.

In the present application, the superimposed element is provided on the side of the beam splitter 411 close to the display screen 1, which can more directly regulate the light entering the optical system, optimize the structural design, and improve the compactness and integration of the optical system.

It should be noted that the light emitted from the display screen 1 should be circularly polarized light. The superimposed element can ensure that the light emitted from the display screen 1 is circularly polarized light. This design is crucial to ensuring the imaging stability and image quality of the optical system, because circularly polarized light has better anti-interference and higher clarity during transmission.

Figure 3:
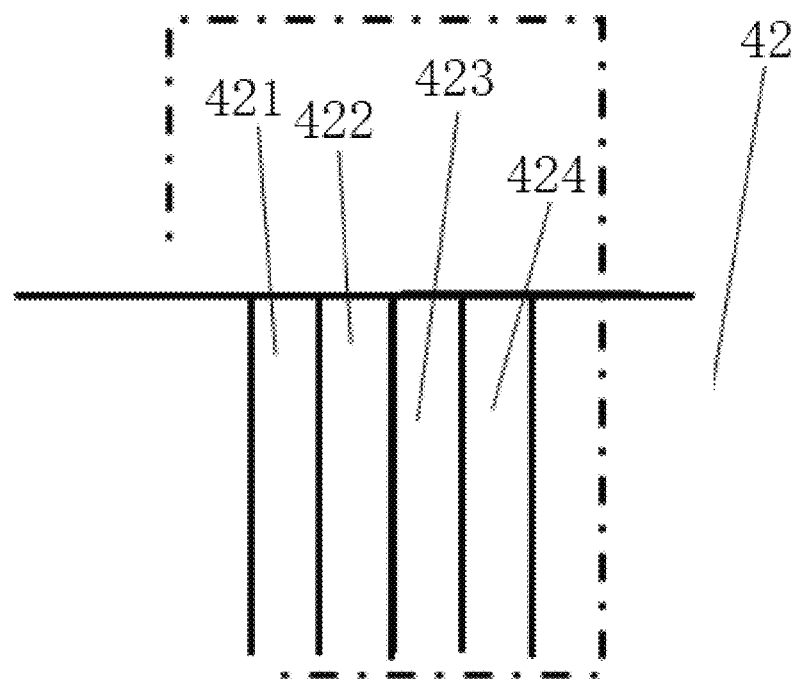
FIG. 3 is a schematic diagram of a film on one surface of a second lens of the optical system according to an embodiment of the present application.

In some examples of the present application, as shown in FIG. 1 and FIG. 3, the beam splitter 411 is provided on the surface of the second lens 4 close to the display screen 1; the phase retarder 424 and the polarization reflection element 423 are sequentially stacked on the surface of the second lens 4 away from the display screen 1.

According to the above example, as shown in FIG. 1, only two lenses can be used in the optical system: the first lens 3 and the second lens 4. The first lens 3 is close to the display screen 1, and the second lens 4 is close to the human eye 01. Based on this optical architecture, the beam splitter 411 is provided on the surface of the second lens 4 close to the display screen 1 (i.e., the third surface 41 shown in FIG. 1), and the phase retarder 424 and the polarization reflection element 423 are stacked and provided together on the surface of the second lens 4 away from the display screen 1 (i.e., the fourth surface 42 shown in FIG. 1). Under this design, the total length of the optical system formed is short.

Moreover, by using the lens in the optical system to directly support the optical film, there is no need to introduce additional support members in the optical path, which can simplify the structure of the optical path, and the lens and the optical film can be installed synchronously at one time, which can simplify the assembly process.

In an embodiment, the beam splitter 411 is, for example, a semi-transparent and semi-reflective film (BS film), the phase retarder 424 is, for example, a ¼ wave plate (QWB film), and the polarization reflection element 423 is, for example, a polarized reflective film (RP film).

In some examples of the present application, as shown in FIG. 3, the optical system further includes a polarization element 422, which is stacked on a surface of the polarization reflection element 423 away from the phase retarder 424, and the polarization element 422, the polarization reflection element 423 and the phase retarder 424 form a composite film.

The introduction of the polarization element 422 is mainly intended to reduce the influence of stray light, which is important for improving the final imaging quality. In an optical system, stray light is often generated by various undesirable factors such as reflection and scattering, which interfere with the normal imaging process and cause problems such as image blur and reduced contrast. As a special filter, the polarization element can selectively allow light in a specific direction to pass through, thereby effectively suppressing the generation and propagation of stray light.

In addition, in order to further improve the integration and stability of the optical system, as shown in FIG. 3, the polarization element 422, the polarization reflection element 423 and the phase retarder 424 are stacked to form a composite film. This composite film not only has excellent optical properties, but also has a compact structure and is easy to install and maintain. At the same time, it can also effectively reduce the optical interference and error accumulation between different components, and further improve the imaging quality.

In order to further improve the optical performance of the optical system, a first anti-reflection film 421 can also be introduced into the composite film, as shown in FIG. 3, which can effectively reduce the reflection loss of light on the interface and improve the transmittance of light.

In some examples of the present application, as shown in FIG. 19, the lens group also includes a third lens 5, and the third lens 5 is provided between the first lens 3 and the display screen 1; the minimum radius of curvature of a surface of the non-filmed lens in the lens group is $R_{min}$, the focal power of the optical system is $\varphi$, and $R_{min}$ and $\varphi$ satisfy: $R_{min} \cdot \varphi \geq 0.4$.

That is, a lens can be added near the display screen.

The optical system provided in the embodiment of the present application can further improve the overall imaging effect and the image quality of the edge field of view by adding the third lens 5 near the display screen.

In the example of the present application, it is proposed that the minimum radius of curvature of a surface of the non-filmed lens in the lens group is $R_{min}$, the focal power of the optical system is $\varphi$, and $R_{min}$ and $\varphi$ satisfy: $R_{min} \cdot \varphi \geq 0.4$. This design is based on the consideration that since $R_{min}$ is the minimum radius of curvature of a surface of the non-filmed lens in the lens group near the display screen, when $R_{min}$ is small, the thickness of the lens at this point will be thicker (relative to the whole). This is because a smaller radius of curvature means that the lens needs a stronger refractive power at this point. The focal power is inversely proportional to the focal power of the lens. A larger focal power means a smaller focal power, that is, the lens has a stronger ability to deflect light. This can also be achieved by increasing the thickness of the lens in certain areas.

In the present application, the design of $R_{min} \cdot \varphi \geq 0.4$ can ensure that the lens has a strong enough deflection ability while maintaining a certain thickness distribution to prevent it from being too thin or too thick in certain areas. Thinner areas may result in insufficient strength of the lens, while thicker areas may increase the weight and cost of the lens. The condition ($R_{min} \cdot \varphi \geq 0.4$) allows a balance point to be found when designing the lens, so that the lens has a sufficiently strong deflection capability while maintaining a reasonable thickness distribution. This helps to ensure a balance between the performance, strength, weight and cost of the lens.

In some examples of the present application, the focal power of the lens group is $\varphi_1$, and $\varphi_1$ and $\varphi$ satisfy: $0.5 \leq \varphi_1/\varphi < 1$.

According to the example provided in the present application, $0.5 \leq \varphi_1/\varphi < 1$, where $\varphi_1$ is the focal power of the lens group, $\varphi$ is the focal power of the entire optical system, and the lens group is an optical element close to the display screen 1, which has the greatest impact on the optical system. The above-mentioned focal power constraint can ensure that the light from the display screen 1 is fully corrected or enhanced after passing through the lens group, thereby improving the imaging quality, and also improving the imaging quality of the edge field of view.

In some examples of the present application, the thickness of the first lens 3 at 0.7 optical aperture is $H_3$, and the thickness of the third lens 5 at 0.7 optical aperture is $H_4$, and $H_3$ and $H_4$ satisfy: $|H_3-H_4|\leq 1$ mm.

The optical path difference refers to the difference in the accumulated optical path of two beams of light after passing through different paths in the same time. In an optical system, the optical path difference can cause blur or distortion of the image, especially in the edge field of view.

The thickness of the lens affects the refraction path of the light when it passes through the lens. If the thickness difference of the two lenses at the same optical aperture is too large, then their refraction effect on light will also be very different, which may lead to a large optical path difference at the edge of the field of view.

The condition provided in the embodiment of the present application is $|H_3-H_4|\leq 1$ mm, which limits the difference in thickness between the first lens 3 and the third lens 5 at 0.7 optical aperture. When this difference is controlled within 1 mm, the refraction effect of the two lenses on light will be relatively close, resulting in a smaller optical path difference at the edge of the field of view. A smaller optical path difference means that light can be more accurately focused on the imaging surface after passing through the lens group, thereby improving the imaging quality of the edge field of view.

In some examples of the present application, as shown in FIG. 19, the maximum thickness of the third lens 5 from 0.35 optical aperture to 0.67 optical aperture is $H_5$. When $H_5>H_1$, the third lens 5 satisfies: $0.7\leq |H_5-H_0'|/|H_6-H_0'|\leq 3$, $H_6$ is the thickness of the third lens 5 at 1.0 optical aperture, and H0' is the center thickness of the third lens 5.

It should be noted that when the lens group near the display screen includes two lenses: the first lens 3 and the third lens 5, the lens with a larger maximum thickness from 0.35 optical aperture to 0.67 optical aperture among the two lenses is used as the lens near the display screen whose thickness needs to be controlled.

The optical systems shown in FIG. 1, FIG. 9 and FIG. 14 all include two lenses: the first lens 3 and the second lens 4. As shown in FIG. 19, the optical system includes three lenses: the first lens 3, the second lens 4 and the third lens 5. That is, in the optical system provided in the embodiment of the present application, at least two lenses can be used, and more lenses can be appropriately increased as needed.

In the embodiment of the present application, by controlling the film-sticking position of each optical film, the total length of the optical system can be effectively controlled, thereby controlling the axial size of the optical system and realizing miniaturization.

The refractive index range of the materials used in each lens included in the present application is 1.4<n<2.0, and the dispersion coefficient range is 20<v<90.

As shown in FIG. 1, FIG. 9 and FIG. 14, the first lens 3 includes a first surface 31 and a second surface 32, the first surface 31 is close to the display screen 1, and the second surface 32 is far away from the display screen 1.

Figure 4:
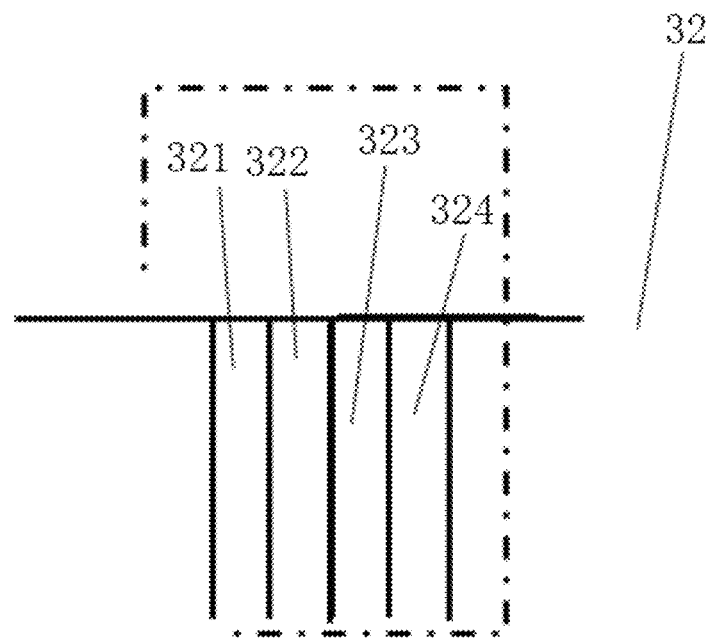
FIG. 4 is a schematic diagram of a film on the other surface of the second lens of the optical system according to an embodiment of the present application.

The center thickness range of the first lens 3 is: 1 mm≤T1≤8 mm, the first surface 31 and the second surface 32 are aspherical or flat; a superimposed element is provided on the second surface 32, as shown in FIG. 4, the superimposed element includes a second anti-reflection film 321, a second retardation plate 322, a polarization film 323 and a first retardation plate 324 stacked in sequence. The superimposed element is located behind the beam splitter 411 in the optical system (close to the display screen)

As shown in FIG. 1, FIG. 9 and FIG. 14, the second lens 4 includes a third surface 41 and a fourth surface 42, the third surface 41 is close to the display screen 1, and the fourth surface 42 is far away from the display screen 1.

Further, the center thickness range of the second lens 4 is: 1 mm≤T2≤10 mm, the third surface 41 and the fourth surface 42 are both aspherical or flat, the third surface 41 is provided with a beam splitter 411, i.e., a semi-transparent and semi-reflective film, and the fourth surface 42 is provided with a composite film, as shown in FIG. 3, the composite film includes a stacked first anti-reflection film 421, a phase retarder 424, a polarization reflection element 423 (transmitting P light and reflecting S light) and a polarization element 422 (transmitting P light).

As shown in FIG. 1, FIG. 9 and FIG. 14, the propagation of light in an optical system is as follows: the display screen 1 can emit unpolarized light, which is transmitted through the protective glass 2 and the first lens 3, and becomes circularly polarized light through the superimposed element on the second surface 32 of the first lens 3, and becomes linearly polarized light (S light) through the phase retarder 424 on the fourth surface 42 of the second lens 4, and is reflected by the polarization reflection element 423, and becomes circularly polarized light again through the phase retarder 424, and is reflected by the beam splitter 411 on the third surface 41 of the second lens 4, and becomes linearly polarized light (P light) through the phase retarder 424 for the third time, and passes through the polarization element 422, and is transmitted by the first anti-reflection film 421, and enters the human eye 01.

The optical system shown in FIG. 19 is different from the optical systems shown in FIG. 1, FIG. 9 and FIG. 14 in that a third lens 5 is added between the first lens 3 and the display screen 1. In this way, the display screen 1 can emit circularly polarized light, which is transmitted through the protective glass 2, the third lens 5, and the first lens 3. The subsequent light propagation path is basically the same as the optical system shown in FIG. 1, FIG. 9 and FIG. 14, and will not be repeated here.

The optical system provided by the present application is further described below through embodiment 1 to embodiment 4.

Embodiment 1

As shown in FIG. 1, the optical system includes a display screen 1, a first lens 3, a superimposed element, a beam splitter 411, a second lens 4, a phase retarder 424, a polarization reflection element 423, and a polarization element 422 provided along the same optical axis; the superimposed element includes a first retardation plate 324, a second retardation plate 322, and a polarization film 323 provided between the first retardation plate 324 and the second retardation plate 322.

As shown in FIG. 3, the beam splitter 411 is provided on the third surface 41 of the second lens 4, the phase retarder 424, the polarization reflection element 423, and the polarization element 422. The polarization reflection element 423 and the polarization element 422 are sequentially stacked on the fourth surface 42 of the second lens 4.

As shown in FIG. 4, the superimposed element is provided on the second surface 32 of the first lens 3.

A protective glass 2 is provided on the luminous surface of the display screen 1, and the total thickness of the protective glass 2 is greater than or equal to 0.5 mm.

The phase retarder 424, the first retardation plate 324, and the second retardation plate 322 are all ¼ wave plates, the beam splitter 411 is a semi-transparent and semi-reflective film, the polarization element 422 is a polarizing film, and the polarization reflection element 423 is a polarizing reflective film.

Table 1 shows the specific optical parameters of the optical system of the embodiment 1.

TABLE 1

| surface | radius (mm) | thickness (mm) | material | Conic | A2 | A4 | A6 | A8 | A10 | A12 | A14 |
|---|---|---|---|---|---|---|---|---|---|---|---|
| 42 | −22.2939 | 6.0222 | APEL | −0.8505 | 0.0000 | 8.883E−06 | 9.616E−08 | 1.592E−10 | −7.679E−13 | 1.036E−15 | 0.000E+00 |
| 41 | −19.9512 | 0.3000 | air | 0.0000 | 0.0000 | −4.202E−06 | −1.764E−08 | 2.314E−10 | −9.319E−14 | −3.213E−15 | 0 |
| 32 | INF | 6.2194 | APEL | 0.0000 | 0.0000 | 0.000E+00 | 0.000E+00 | 0.000E+00 | 0.000E+00 | 0.000E+00 | 0.000E+00 |
| 31 | 8.5332 | 0.5000 | air | −19.9723 | 0.0000 | −1.239E−03 | 2.427E−05 | −2.922E−07 | 3.031E−09 | −2.138E−11 | 6.279E−14 |

Figure 5:
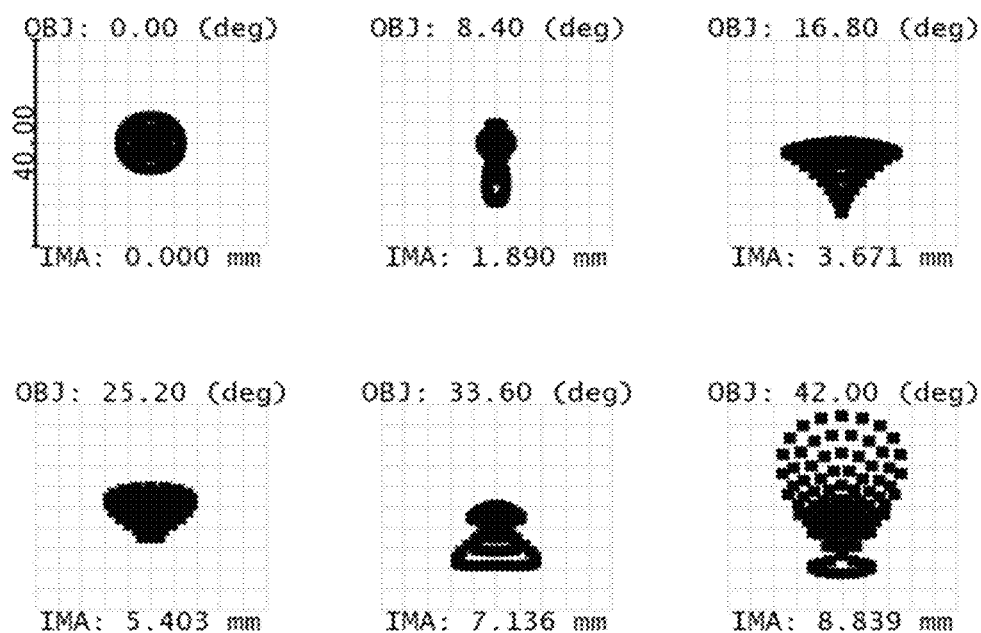
FIG. 5 is a dot array diagram of the optical system shown in FIG. 1.
Figure 6:
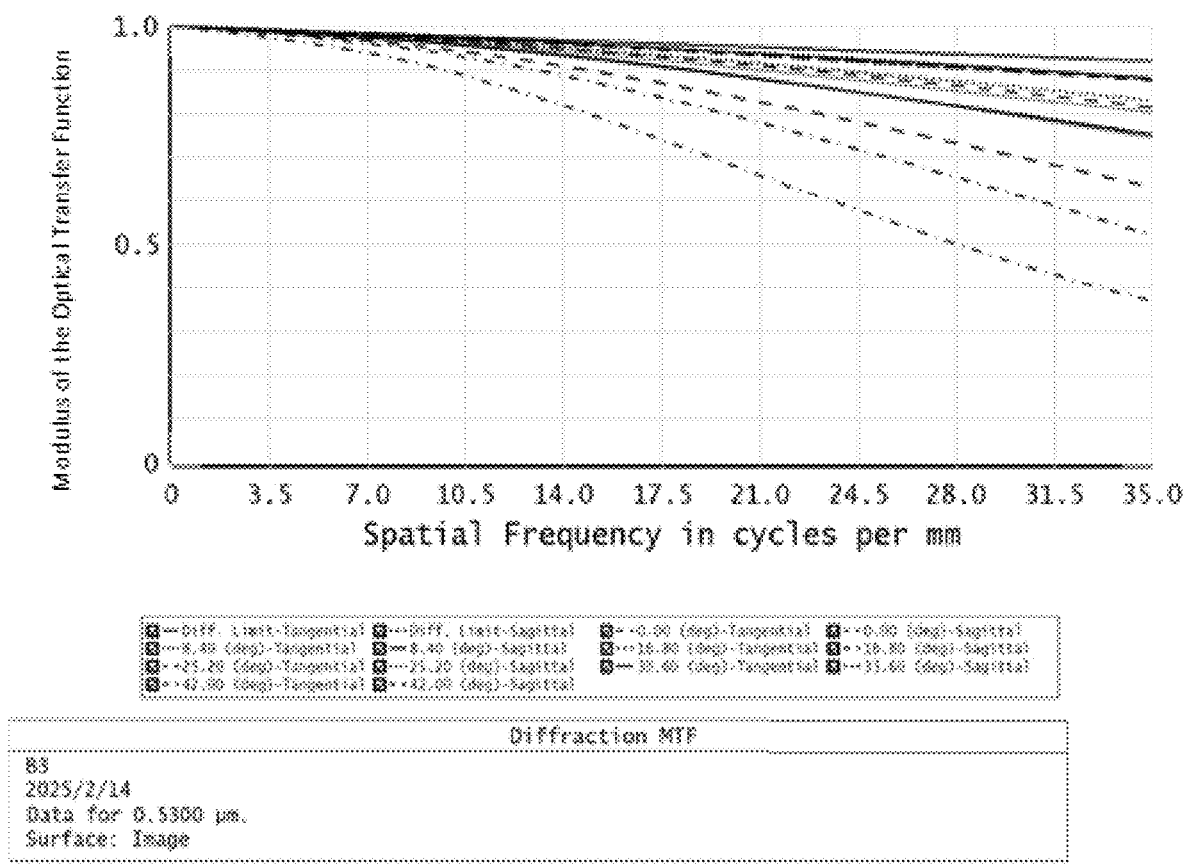
FIG. 6 is a modulation transfer function (MTF) curve diagram of the optical system shown in FIG. 1.
Figure 7:
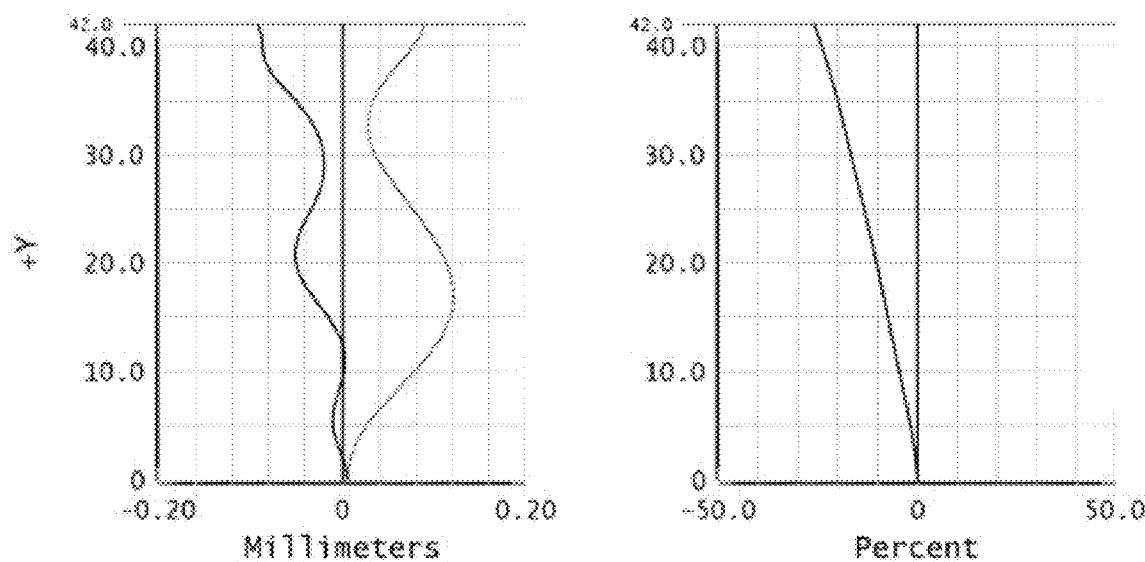
FIG. 7 is a field curvature and distortion diagram of the optical system shown in FIG. 1.
Figure 8:
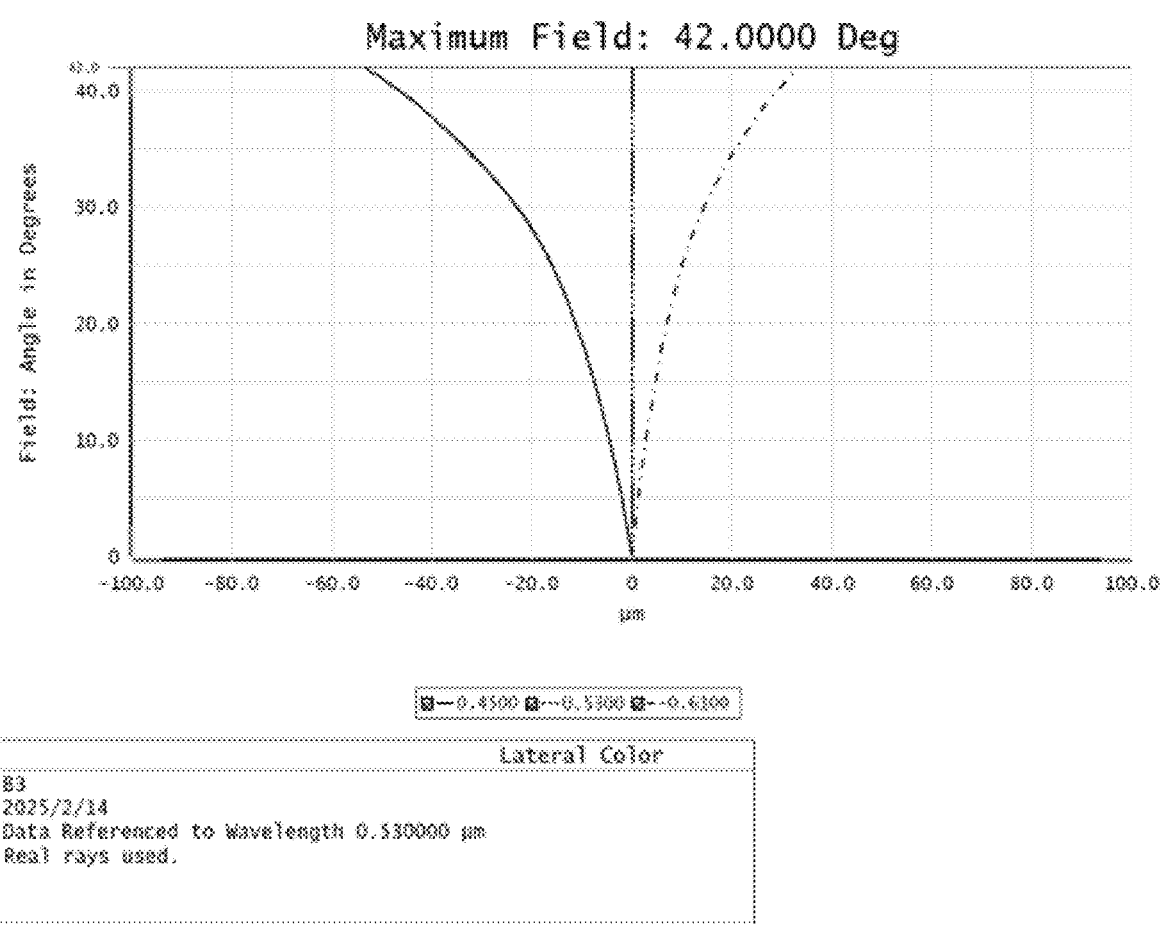
FIG. 8 is a lateral chromatic aberration diagram of the optical system shown in FIG. 1.

The optical system provided in the embodiment 1 has optical performance as shown in FIG. 5 and FIG. 8. FIG. 5 is a dot array diagram, FIG. 6 is a MTF curve diagram, FIG. 7 is a field curvature and distortion diagram, and FIG. 8 is a lateral chromatic aberration diagram.

The dot array diagram refers to the fact that after many light rays emitted from a point pass through the optical system, due to aberration, their intersections with the image plane are no longer concentrated at the same point, but form a diffuse diagram scattered in a certain range, which can be used to evaluate the imaging quality of the optical system. As shown in FIG. 5, the optical system provided in the embodiment 1 has a maximum value of the image point in the dot array diagram less than 9 agr The MTF curve diagram is a modulation transfer function diagram, which characterizes the imaging clarity of the optical system by the contrast of black and white line pairs. As shown in FIG. 6, the optical system provided in the embodiment 1 has an MTF greater than 0.45 at 35 lp/mm, and the imaging is relatively clear.

As shown in FIG. 7, the optical system provided in the embodiment 1 has a maximum distortion occurring in 1 field of view, and the absolute value is less than 30%.

Lateral chromatic aberration is also called magnification chromatic aberration, which mainly refers to the difference in the focal position of blue light and red light on the image plane, when a complex main light ray on the object side becomes multiple light rays due to the dispersion of the refraction system when it is emitted on the image side. As shown in FIG. 8, the optical system provided by the embodiment 1 has a maximum chromatic aberration value less than 90 μm.

Embodiment 2

As shown in FIG. 9, the embodiment 2 has the same optical architecture as the above-mentioned embodiment 1.

The difference between the embodiment 2 and the above-mentioned embodiment 1 is that the optical parameters are different. Table 2 shows the optical parameters of the near-eye optics provided by the embodiment 2.

TABLE 2

| surface | radius (mm) | thickness (mm) | material | Conic | A2 | A4 | A6 | A8 | A10 | A12 | A14 |
|---|---|---|---|---|---|---|---|---|---|---|---|
| 42 | −19.9931 | 6.0610 | APEL | −11.2005 | 0.0000 | 1.370E−05 | −1.322E−07 | 1.190E−09 | −3.168E−12 | 3.377E−15 | 0.000E+00 |
| 41 | −19.7234 | 0.3000 | air | −0.9880 | 0.0000 | 1.472E−05 | −1.413E−08 | −3.492E−10 | 4.397E−12 | −1.836E−14 | 3.633E−17 |
| 32 | INF | 2.0164 | APEL | 0.0000 | 0.0000 | 0.000E+00 | 0.000E+00 | 0.000E+00 | 0.000E+00 | 0.000E+00 | 0.000E+00 |
| 31 | −10.8038 | 0.5000 | air | −23.4599 | 0.0000 | 3.665E−04 | 1.168E−06 | −9.705E−08 | 3.935E−10 | 8.087E−12 | −8.183E−14 |

Figure 10:
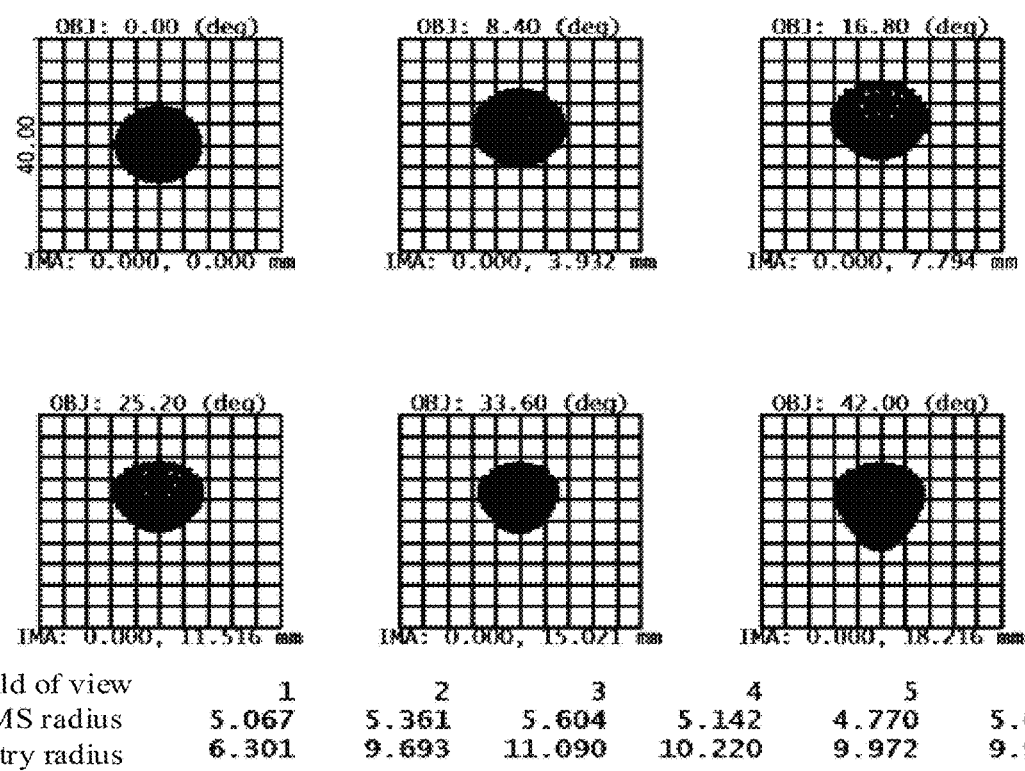
FIG. 10 is a dot array diagram of the optical system shown in FIG. 9.
Figure 11:
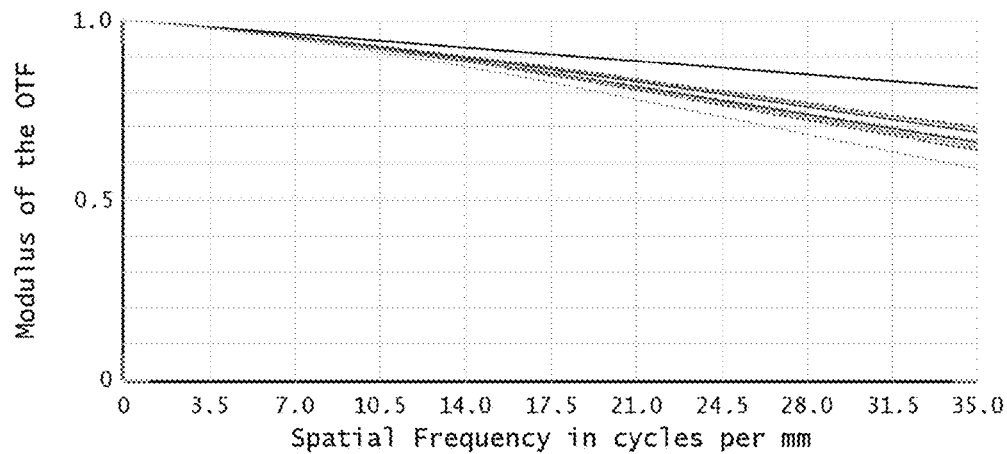
FIG. 11 is a modulation transfer function (MTF) curve diagram of the optical system shown in FIG. 9.
Figure 12:
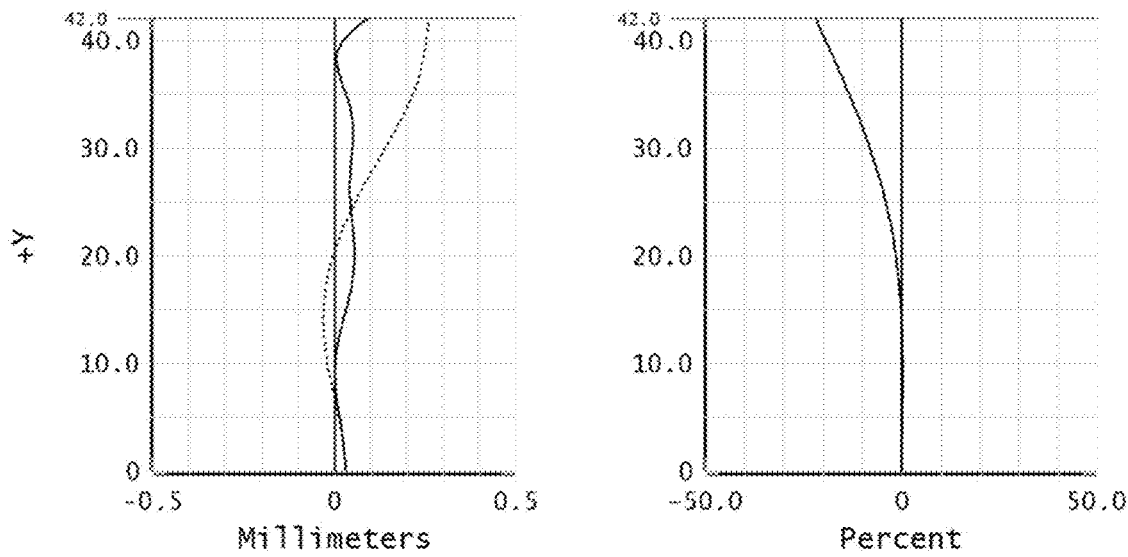
FIG. 12 is a field curvature and distortion diagram of the optical system shown in FIG. 9.
Figure 13:
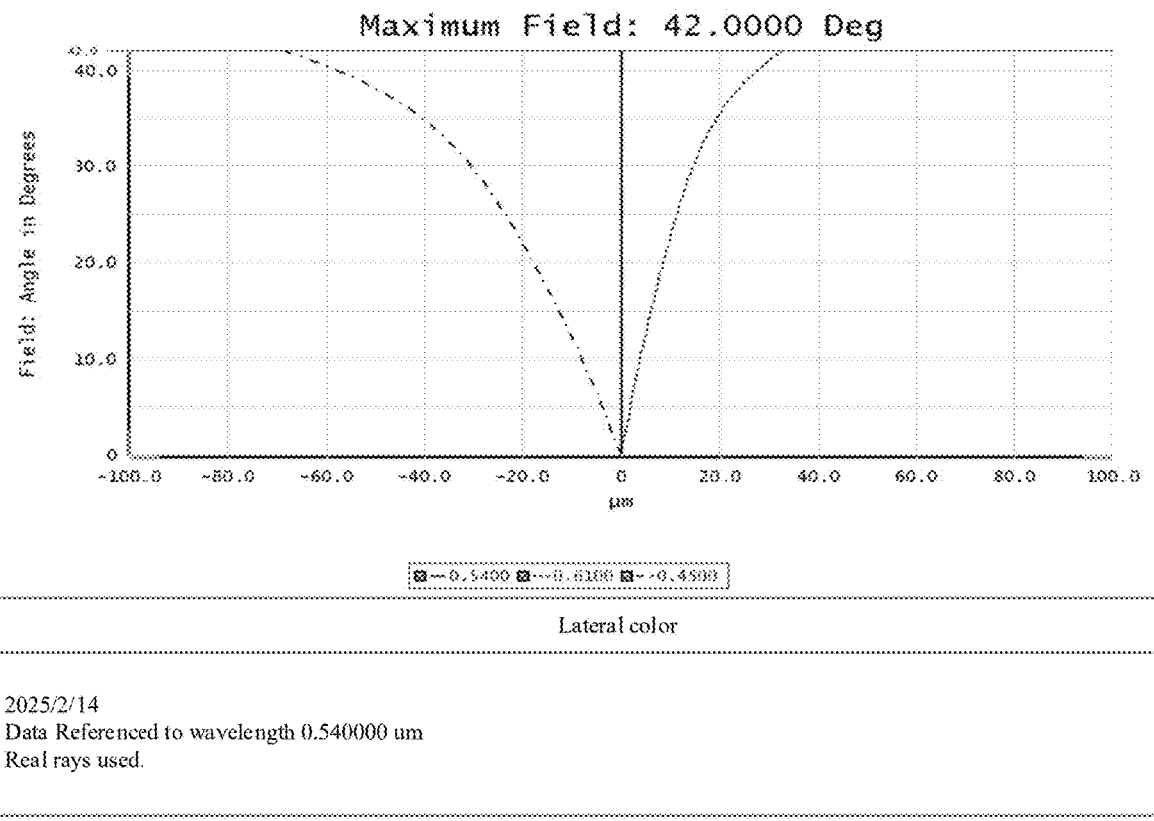
FIG. 13 is a lateral chromatic aberration diagram of the optical system shown in FIG. 9.

For the optical system in the embodiment 2, its optical performance can be shown in FIG. 10 to FIG. 13. FIG. 10 is a dot array diagram, FIG. 11 is a MTF curve diagram, FIG. 12 is a field curvature and distortion diagram, and FIG. 13 is a lateral chromatic aberration diagram.

As shown in FIG. 10, the optical system provided in the embodiment 2 has a maximum value of the image point in the dot array diagram less than 6 agr As shown in FIG. 11, the optical system provided in the embodiment 2 has an MTF greater than 0.5 at 35 lp/mm, and the imaging is clear.

As shown in FIG. 12, the optical system provided in the embodiment 2 has a maximum distortion occurring in 1 field of view, and the absolute value is less than 30%.

As shown in FIG. 13, the optical system provided in the embodiment 2 has a maximum chromatic aberration value less than 120 μm.

Embodiment 3

As shown in FIG. 14, the embodiment 3 has the same optical architecture as the above-mentioned embodiment 1.

The difference between the embodiment 3 and the above-mentioned embodiment 1 is that the optical parameters are different. Table 3 shows the optical parameters of the near-eye optics provided in the embodiment 3.

TABLE 3

| surface | radius (mm) | thickness (mm) | material | Conic | A2 | A4 | A6 | A8 | A10 | A12 | A14 |
|---|---|---|---|---|---|---|---|---|---|---|---|
| 42 | −15.2441 | 5.5496 | APEL | −2.4209 | 0.0000 | 5.977E−06 | 1.018E−07 | 1.393E−10 | −3.233E−13 | −9.399E−17 | 0.000E+00 |
| 41 | −16.7663 | 0.2900 | air | −0.8605 | 0.0000 | −7.665E−06 | −2.570E−08 | 1.891E−10 | 4.632E−13 | −3.974E−15 | 2.254E−17 |
| 32 | INF | 2.0000 | APEL | 0.0000 | 0.0000 | 0.000E+00 | 0.000E+00 | 0.000E+00 | 0.000E+00 | 0.000E+00 | 0.000E+00 |
| 31 | −61.9928 | 0.4750 | air | 7.4489 | 0.0000 | −9.997E−04 | 5.127E−05 | −8.618E−07 | 6.133E−09 | −1.506E−11 | −6.990E−15 |

Figure 15:
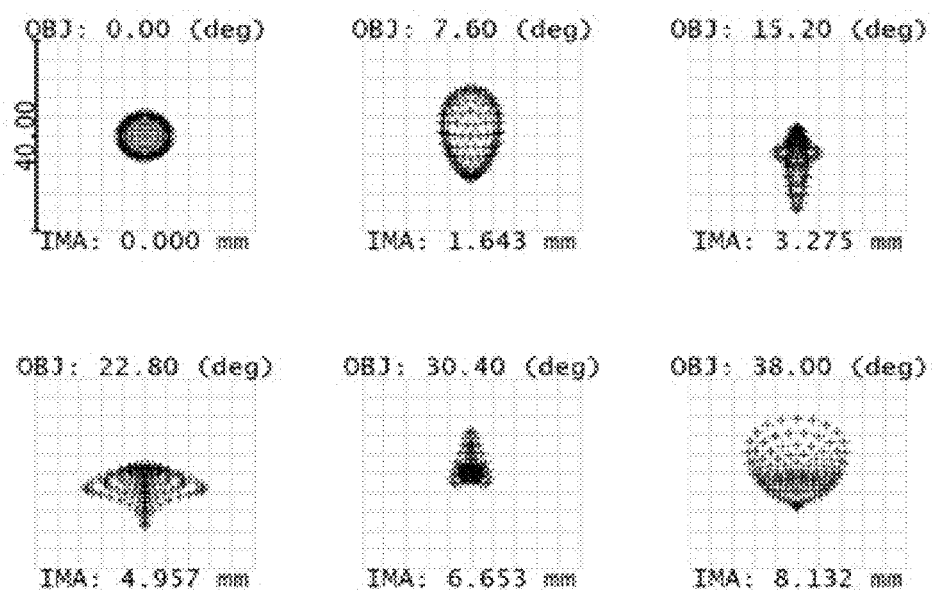
FIG. 15 is a dot array diagram of the optical system shown in FIG. 14.
Figure 16:
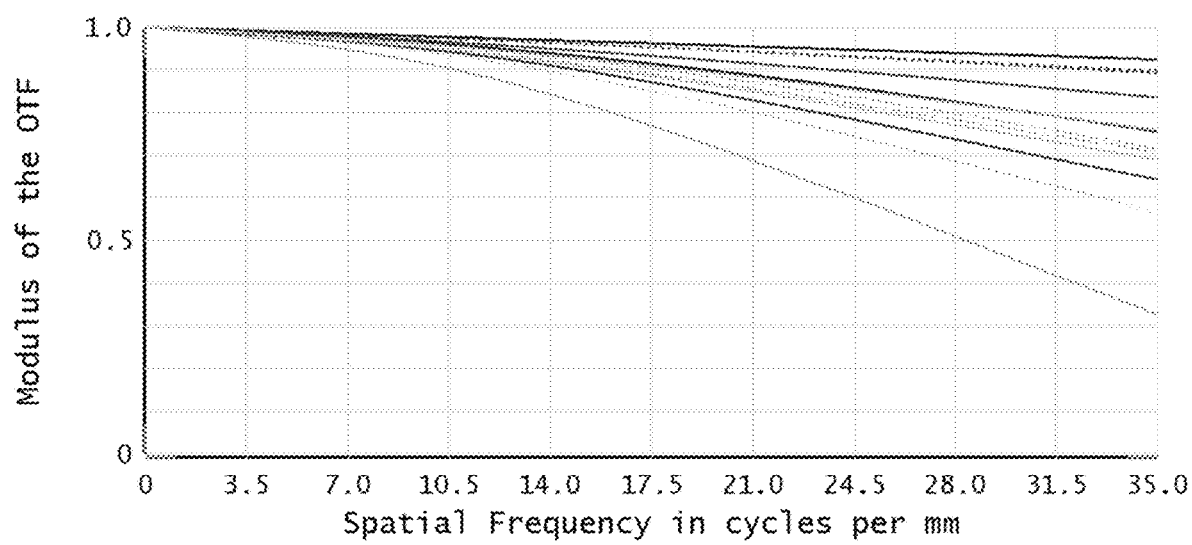
FIG. 16 is a modulation transfer function (MTF) curve diagram of the optical system shown in FIG. 14.
Figure 17:
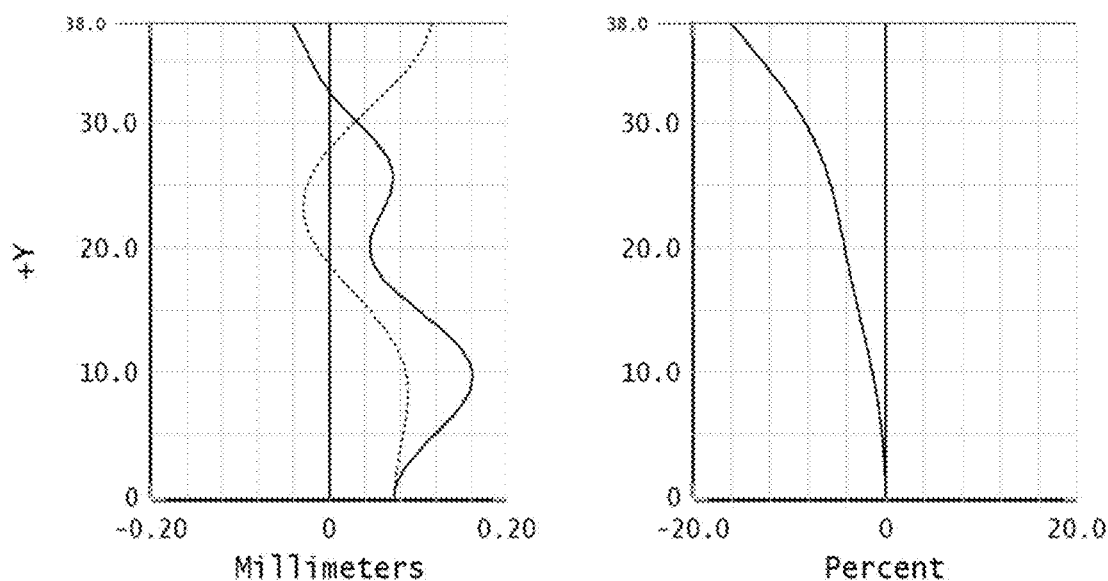
FIG. 17 is a field curvature and distortion diagram of the optical system shown in FIG. 14.
Figure 18:
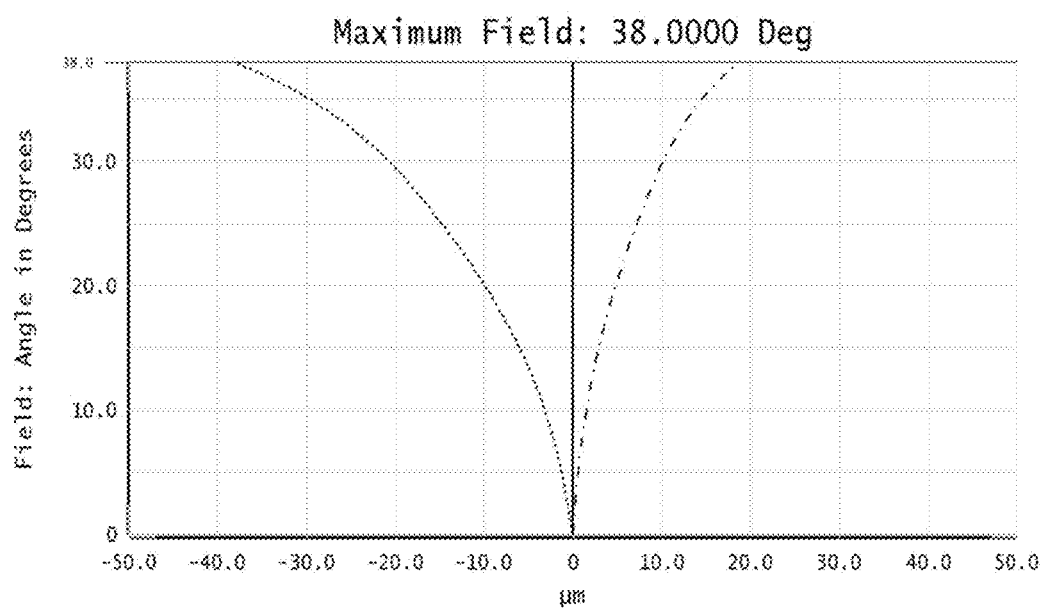
FIG. 18 is a lateral chromatic aberration diagram of the optical system shown in FIG. 14.

For the optical system provided in the embodiment 3, its optical performance can be shown in FIG. 15 to FIG. 18. FIG. 15 is a dot array diagram, FIG. 16 is a MTF curve diagram, FIG. 17 is a field curvature and distortion diagram, and FIG. 18 is a lateral chromatic aberration diagram.

As shown in FIG. 15, the optical system provided in the embodiment 3 has a maximum value of the image point in the dot array diagram less than 7 agr As shown in FIG. 16, the optical system provided in the embodiment 3 has a MTF greater than 0.3 at 35 lp/mm, and the imaging is clear.

As shown in FIG. 17, the optical system provided in the embodiment 3 has a maximum distortion occurring in 1 field of view, and the absolute value is less than 30%.

As shown in FIG. 18, the optical system provided in the embodiment 3 has a maximum chromatic aberration value less than 60, a Embodiment 4

As shown in FIG. 19, the difference between the embodiment 4 and the above-mentioned embodiment 1 to embodiment 3 is that a third lens 5 is added between the first lens 3 and the display screen 1, and the optical parameters are different. Table 4 shows the optical parameters of the near-eye optics provided in the embodiment 3. In other words, the embodiment 3 uses one more lens than embodiment 1 and embodiment 2, and adopts the optical parameters in Table 3.

TABLE 4

| surface | radius (mm) | thickness (mm) | material | Conic | A2 | A4 | A6 | A8 | A10 | A12 |
|---|---|---|---|---|---|---|---|---|---|---|
| 52 | −25.7041 | 5.8164 | APEL | −3.30E+00 | 0.00E+00 | 4.44E−06 | 7.89E−08 | 2.04E−11 | −2.15E−13 | 3.12E−16 |
| 51 | −21.7464 | 0.3000 | | −2.55E−01 | 0 | 3.601E−06 | 2.187E−08 | 4.746E−11 | 5.479E−13 | −2.178E−15 |
| 42 | Infinity | 2.1775 | APEL | 0.0000 | 0.0000 | 0.000E+00 | 0.000E+00 | 0.000E+00 | 0.000E+00 | 0.000E+00 |
| 41 | −36.5764 | 0.5000 | | −0.2040 | 0.0000 | 1.623E−05 | −1.162E−07 | 7.397E−09 | −5.263E−11 | 1.959E−13 |
| 32 | −65.6293 | 1.9146 | APEL | −0.0276 | 0.0000 | 4.531E−05 | 5.584E−08 | 2.758E−09 | 0.000E+00 | 0.000E+00 |
| 31 | −120.6129 | 0.2000 | | 0.0600 | 0.0000 | −5.116E−06 | 1.886E−08 | 3.299E−10 | 0.000E+00 | 0.000E+00 |

Figure 20:
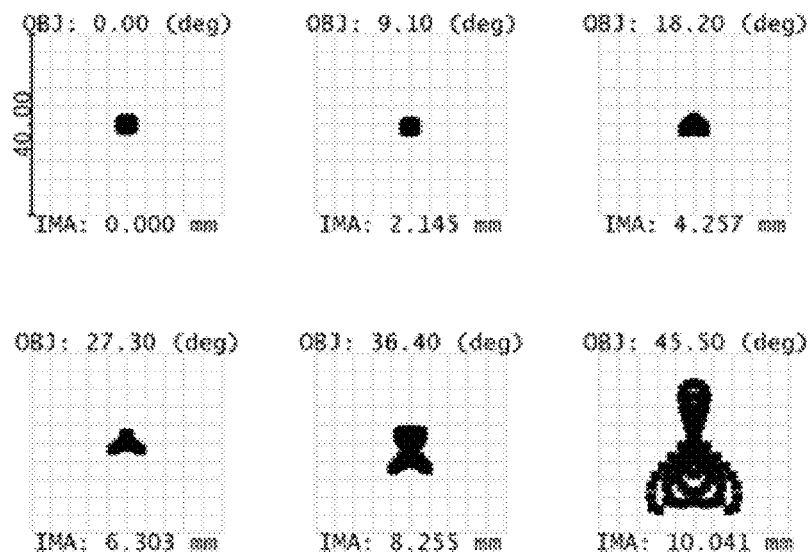
FIG. 20 is a dot array diagram of the optical system shown in FIG. 19.
Figure 20:
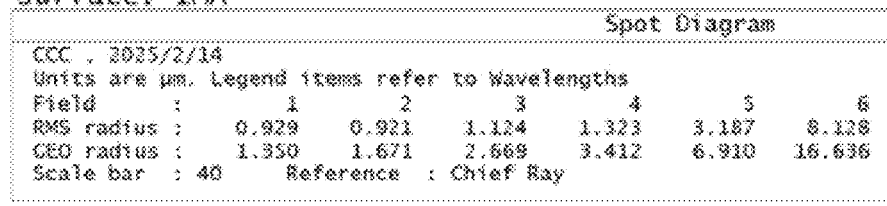
Figure 21:
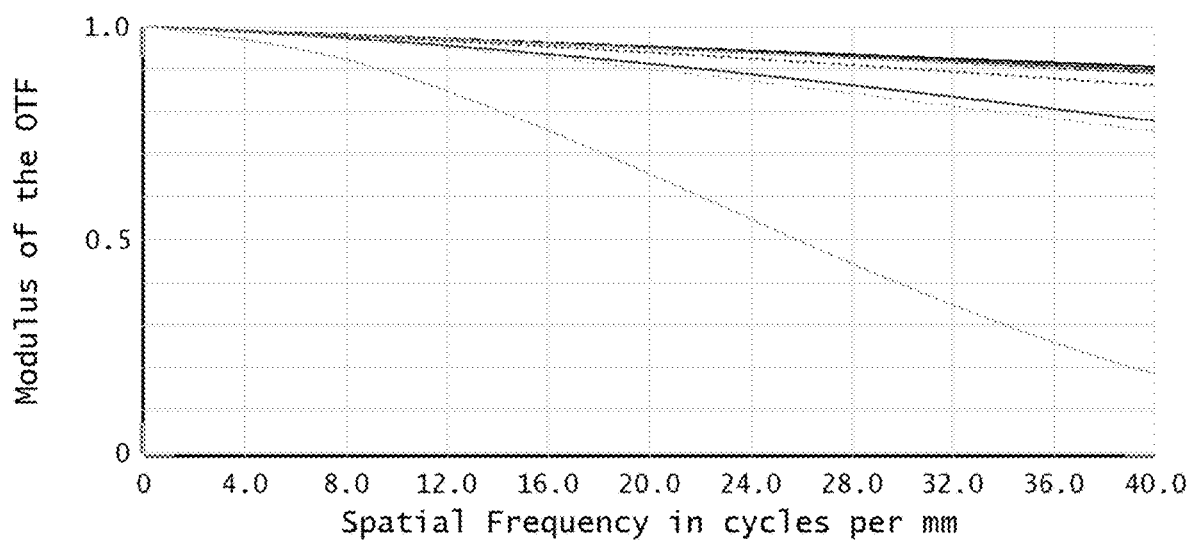
FIG. 21 is a modulation transfer function (MTF) curve diagram of the optical system shown in FIG. 19.
Figure 22:
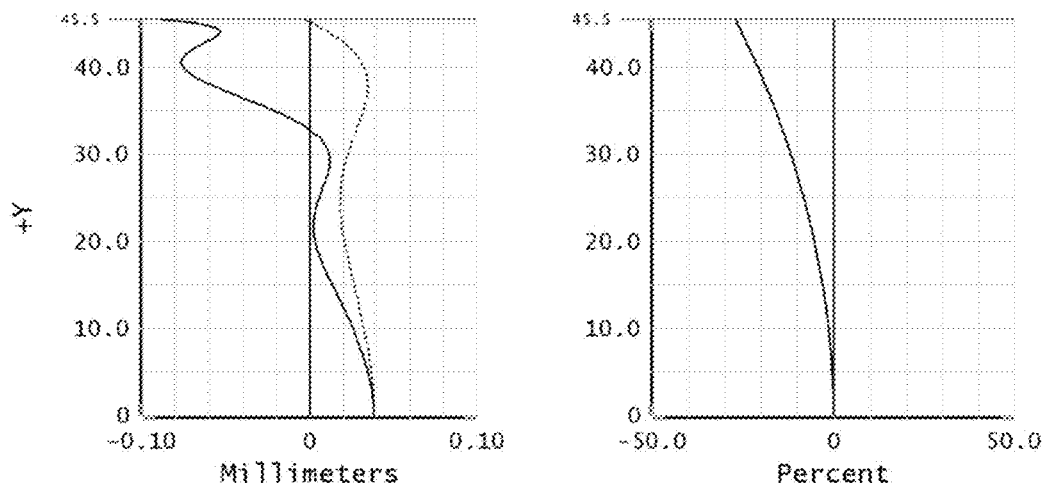
FIG. 22 is a field curvature and distortion diagram of the optical system shown in FIG. 19.
Figure 23:
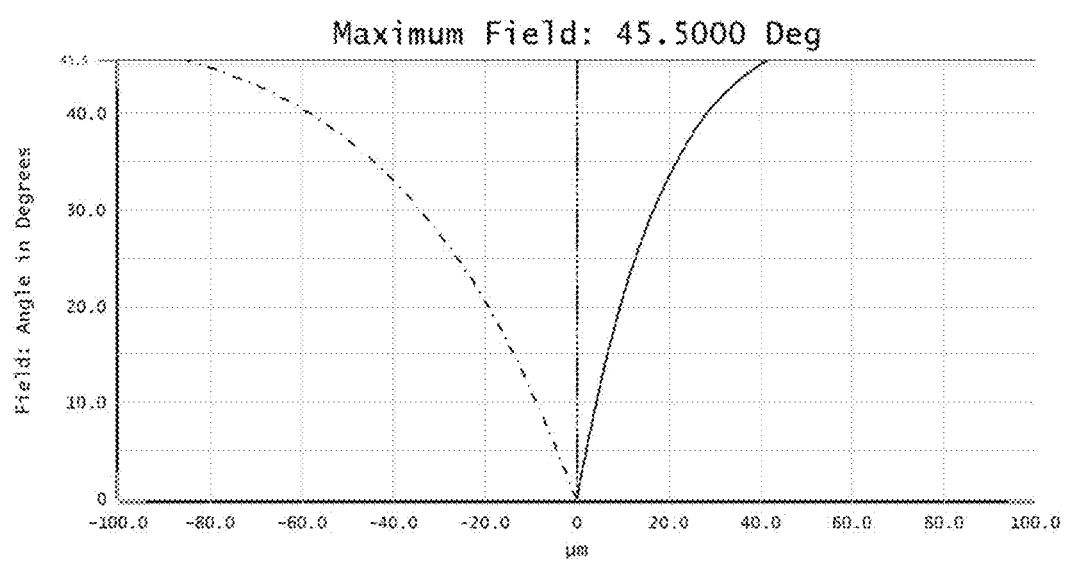
FIG. 23 is a lateral chromatic aberration diagram of the optical system shown in FIG. 19.

For the optical system provided in the embodiment 4, its optical performance can be shown in FIG. 20 to FIG. 23. FIG. 20 is a dot array diagram, FIG. 21 is a MTF curve diagram, FIG. 22 is a field curvature and distortion diagram, and FIG. 23 is a lateral chromatic aberration diagram.

As shown in FIG. 20, the optical system provided in the embodiment 4 has a maximum value of the image point in the dot array diagram less than 9 agr As shown in FIG. 21, the optical system provided in the embodiment 4 has a MTF greater than 0.3 at 35 lp/mm, and the imaging is clear.

As shown in FIG. 22, the optical system provided in the embodiment 4 has a maximum distortion occurring in 1 field of view, and the absolute value is less than 30%.

As shown in FIG. 23, the optical system provided in the embodiment 4 has a maximum chromatic aberration value less than 130 an According to the above-mentioned embodiment 1 to embodiment 4, the thickness ratio of the lens near the display screen can be seen in Table 5 below.

TABLE 5

| | Embodiment 1 | Embodiment 2 | Embodiment 3 | Embodiment 4 |
|---|---|---|---|---|
| center thickness of the lens $H_0$/mm | 2 | 2 | 2.1 | 2.17 |
| thickness of the lens at the maximum outer diameter $H_2$/mm | 1.76 | 1.89 | 1.39 | 1.4 |
| The maximum thickness of the lens at the optical diameter of 0.35 to 0.67 $H_1$/mm | 2.34 | 1.68 | 1.54 | 1.6 |

The present application further provides a display device, including a housing and an optical system as described above.

The specific implementation of the display device of the embodiment of the present application can refer to the above-mentioned embodiments of the optical system, so it at least has all the beneficial effects brought by the technical solutions of the above-mentioned embodiments, which will not be described one by one here.

The above embodiments focus on the differences between the various embodiments. As long as the different optimization features between the various embodiments are not contradictory, they can be combined to form a better embodiment. Considering the simplicity of the text, they will not be described here.

Although some specific embodiments of the present application have been described in detail through examples, those skilled in the art should understand that the above examples are only for illustration, not for limiting the scope of the present application. Those skilled in the art should understand that the above embodiments can be modified without departing from the scope of the present application. The scope of the present application is defined by the attached claims.

What is claimed is:

1. An optical system, comprising:
   a beam splitter;
   a phase retarder;
   a polarization reflection element;
   a lens group; and
   a second lens;
   wherein the beam splitter, the phase retarder and the polarization reflection element are provided along a same optical axis, and the phase retarder is provided between the beam splitter and the polarization reflection element;
   the lens group and the second lens are provided along the optical axis, the lens group at least comprises a first lens, and the first lens is provided on a side of the beam splitter away from the phase retarder;
   the first lens satisfies: $0.7 \leq |H_1 - H_0|/|H_2 - H_0| \leq 3$, wherein $H_1$ is a maximum thickness of the first lens at a specific aperture, $H_2$ is a thickness of the first lens at an optical aperture of 1.0, and $H_0$ is a center thickness of the first lens; and
   the maximum thickness of the first lens at a specific aperture is a maximum thickness of the first lens at an optical aperture of 0.35 to 0.67.

2. The optical system according to claim 1, wherein the second lens is provided between the beam splitter and the phase retarder.

3. The optical system according to claim 2, further comprising:
   a display screen,
   wherein the display screen is provided on a side of the lens group away from the second lens.

4. The optical system according to claim 3, wherein a superimposed element is provided on a side of the first lens away from the display screen, and the superimposed element comprises a first retardation plate, a second retardation plate, and a polarizing film provided between the first retardation plate and the second retardation plate.

5. The optical system according to claim 3, wherein the beam splitter is provided on a surface of the second lens close to the display screen, and the phase retarder and the polarization reflection element are sequentially stacked on a surface of the second lens away from the display screen.

6. The optical system according to claim 5, further comprising:
   a polarization element;
   wherein the polarization element is stacked on a surface of the polarization reflection element away from the phase retarder, and the polarization element, the polarization reflection element and the phase retarder form a composite film.

7. The optical system according to claim 5, wherein the lens group further comprises a third lens, and the third lens is provided between the first lens and the display screen, a minimum radius of curvature of a surface of a non-filmed lens in the lens group is $R_{min}$, a focal power of the optical system is $\varphi$, and $R_{min}$ and $\varphi$ satisfy: $R_{min} \cdot \varphi \geq 0.4$.

8. The optical system according to claim 7, wherein a focal power of the lens group is $\varphi_1$, and $\varphi_1$ and $\varphi$ satisfy: $0.5 \leq \varphi_1/\varphi < 1$.

9. The optical system according to claim 7, wherein a thickness of the first lens at 0.7 optical aperture is $H_3$, a thickness of the third lens at 0.7 optical aperture is $H_4$, and $H_3$ and $H_4$ satisfy: $|H_3 - H_4| \leq 1$ mm.

10. The optical system according to claim 7, wherein a maximum thickness of the third lens from 0.35 optical aperture to 0.67 optical aperture is $H_5$, and when $H_5 > H_1$, the third lens satisfies: $0.7 \leq |H_5 - H_0'|/|H_6 - H_0'| \leq 3$, wherein $H_6$ is a thickness of the third lens at 1.0 optical aperture, and $H_0'$ is a center thickness of the third lens.

11. The optical system according to claim 3, wherein a protective glass is provided on a side of the display screen close to the first lens, and the protective glass comprises at least one layer and a total thickness of the protective glass is greater than or equal to 5 mm.

12. A display device, comprising:
a housing; and
the optical system according to claim 1.

* * * * *